US011671492B2

(12) United States Patent
Yonekura et al.

(10) Patent No.: US 11,671,492 B2
(45) Date of Patent: Jun. 6, 2023

(54) MULTIPART UPLOAD FOR DISTRIBUTED FILE SYSTEMS

(71) Applicant: EMC IP Holding Company LLC, Hopkinton, MA (US)

(72) Inventors: Takafumi Yonekura, Bellevue, WA (US); Jason Kramberger, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/017,264

(22) Filed: Sep. 10, 2020

(65) Prior Publication Data

US 2022/0078236 A1 Mar. 10, 2022

(51) Int. Cl.

*H04L 67/1097* (2022.01)
*G06F 16/182* (2019.01)
*H04L 67/06* (2022.01)

(52) U.S. Cl.

CPC ........ *H04L 67/1097* (2013.01); *G06F 16/182* (2019.01); *H04L 67/06* (2013.01)

(58) Field of Classification Search

CPC ............... G06F 16/2246; G06F 16/182; H04L 67/1097; H04L 67/06
USPC .......................................................... 709/217
See application file for complete search history.

(56) References Cited

U.S. PATENT DOCUMENTS 5,752,243 A * 5/1998 Reiter ................. G06F 16/2246
10,503,713 B1 * 12/2019 Gattu .................... G06F 16/219
10,700,711 B1 * 6/2020 Cook .................... G06F 16/289
2002/0087500 A1 * 7/2002 Berkowitz .......... G06F 16/2308
2013/0269039 A1 * 10/2013 Gold ...................... G06F 21/64 726/27
2017/0060924 A1 * 3/2017 Fitzhardinge ......... G06F 16/289
2017/0091235 A1 * 3/2017 Yammine ............ G06F 16/1865
2017/0177644 A1 * 6/2017 Golander ............ G06F 16/9027
2018/0034892 A1 * 2/2018 Olsen .................. H04L 65/4023
2018/0225316 A1 * 8/2018 Boles .................. G06F 16/2246
2019/0320022 A1 * 10/2019 Raghunath ............ H04L 67/101
2020/0310859 A1 * 10/2020 Gupta ................... G06F 3/0635

(Continued)

OTHER PUBLICATIONS

"Amazon S3 Rest API Introduction," https://docs.aws.amazon.com/AmazonS3/latest/API/Welcome.html, 1 page.

(Continued)

*Primary Examiner* — Mohamed A. Wasel
*Assistant Examiner* — Tesfu N Mekonen
(74) *Attorney, Agent, or Firm* — Amin, Turocy & Watson, LLP

(57) ABSTRACT

Described herein are technologies directed to multipart upload. A cluster coherent unique identifier for a multipart upload can be generated by creating a leaf in a B-tree. The leaf in the B-tree can comprise a key, and the key can comprise an upload identifier and a group identifier associated with a group of multipart uploads. A parts directory can be created for the multipart upload, wherein elements of the parts directory can be identified using the group identifier and the upload identifier. Upload parts can be transmitted from a client device to a server device, and stored in the parts directory. To complete the multipart upload, the upload parts can be concatenated and stored at a target location.

20 Claims, 10 Drawing Sheets

Client Device 210
MPU Manager 211
File 212
MPU 213
Part 213A
Part 213B
Part 213C
Initiation 231
MPU Info 232
Part 213A
Part 213B
Part 213C
Cluster 220
B-tree 230
MPU Manager 221
Upload ID 222
Parts Directory 223
Concatenation & Storage 224
Target Location 227
212
Distributed Filesystem 225

(56) References Cited

U.S. PATENT DOCUMENTS

2020/0349139 A1* 11/2020 Boles .................. G06F 16/2246
2021/0097202 A1* 4/2021 Datta .................. G06F 21/6227
2021/0303537 A1* 9/2021 Liang .................. G06F 16/2358

OTHER PUBLICATIONS

"Error Responses," https://docs.aws.amazon.com/AmazonS3/latest/API/ErrorResponses.html, 15 pages.
"Bucket restrictions and limitations," https://docs.aws.amazon.com/AmazonS3/latest/dev/BucketRestrictions.html, 2 pages.
"Signature Calculations for the Authorization Header: Transferring Payload in Multiple Chunks (Chunked Upload) (AWS Signature Version 4)," https://docs.aws.amazon.com/AmazonS3/latest/API/sigv4-strea.
"Common Request Headers," https://docs.aws.amazon.com/AmazonS3/latest/API/RESTCommonRequestHeaders.html, 2 pages.
"Common Response Headers," https://docs.aws.amazon.com/AmazonS3/latest/APIRESTCommonResponseHeaders.html, 2 pages.
"Multipart upload overview," https://docs.aws.amazon.com/AmazonS3/latest/dev/mpuoverview.html, 4 pages.

* cited by examiner

MULTIPART UPLOAD FOR DISTRIBUTED FILE SYSTEMS

TECHNICAL FIELD

The subject disclosure relates generally to electronic data storage, namely, multipart upload of objects to server computing devices.

BACKGROUND

Today's network computing architectures support storage of large numbers of objects at server devices and anytime, anywhere access to the objects by client devices with appropriate credentials. A variety of technologies support object storage and retrieval, as well as related security and administrative functions.

Multipart upload generally provides for upload of large objects in parts. A multipart upload can be initiated at a client device to upload the parts from the client device to server devices. Large multipart uploads can take time to complete. For example, hours, days or even weeks may be needed to complete some large multipart uploads. Furthermore, today's large scale cloud computing platforms and enterprise computing clusters are required to handle many overlapping multipart uploads simultaneously. Simultaneous handling of many multipart uploads over long complete times gives rise to a need for sophisticated techniques to uniquely identify multipart uploads.

The above-described background is merely intended to provide a contextual overview of some current issues and is not intended to be exhaustive. Other contextual information may become further apparent upon review of the following detailed description.

DETAILED DESCRIPTION

Figure 1:
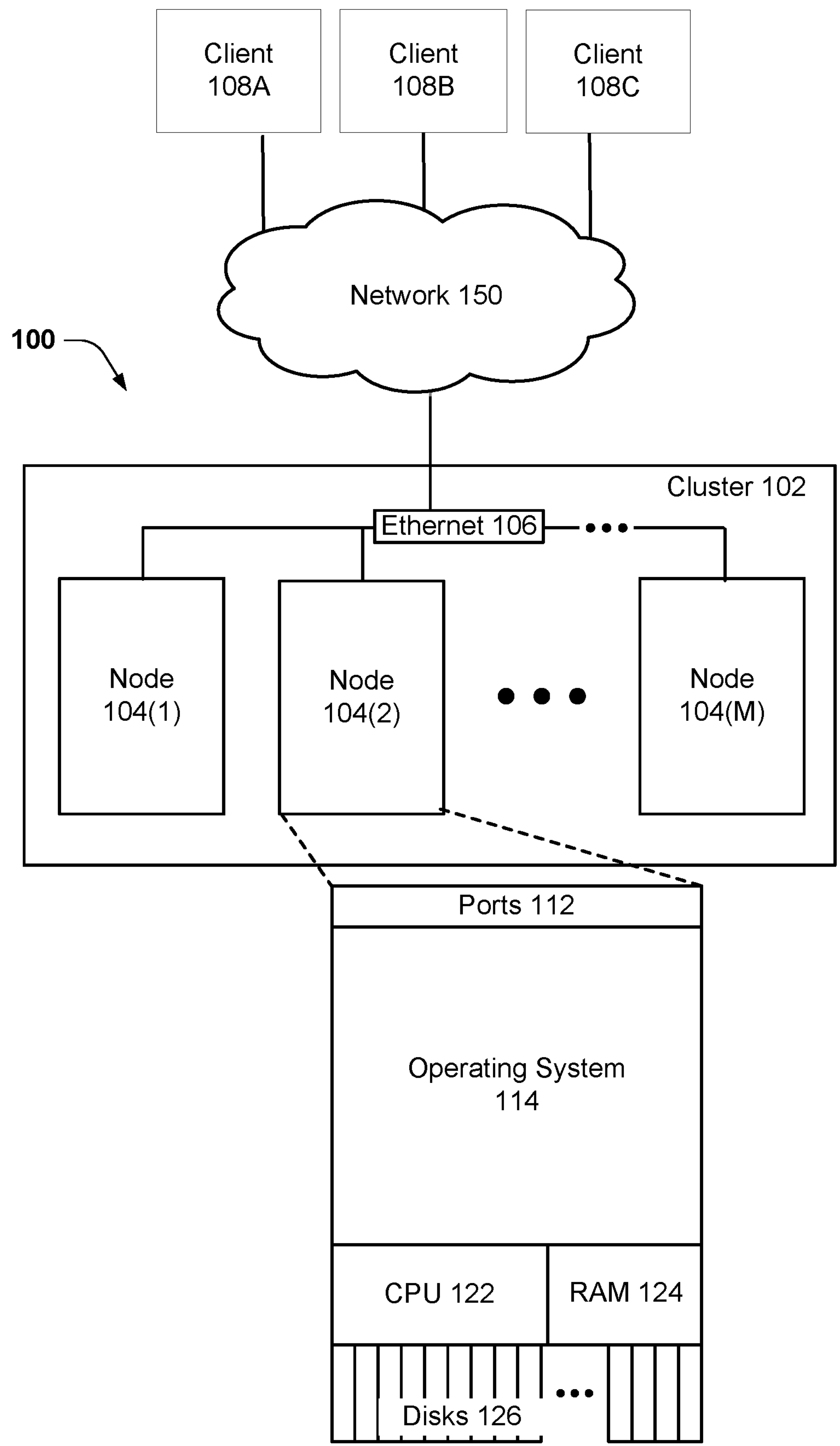
FIG. 1 illustrates an example cluster of computing devices, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to multipart upload techniques, as well as devices and computer readable media configured to perform the disclosed multipart upload techniques. A cluster coherent unique identifier for a multipart upload can be generated by creating a leaf in a B-tree. The leaf in the B-tree can comprise a key, and the key can comprise an upload identifier and a group identifier associated with a group of multipart uploads. A parts directory can be created for the multipart upload, wherein elements of the parts directory can be identified using the group identifier and the upload identifier. Upload parts can be transmitted from a client device to a server device, and stored in the parts directory. To complete the multipart upload, the upload parts can be concatenated and stored at a target location. Further aspects and embodiments of this disclosure are described in detail herein.

FIG. 1 illustrates an example cluster of computing devices, in accordance with one or more embodiments described herein. FIG. 1 includes a cluster 102 of node devices, referred to in FIG. 1 as nodes 104(1), 104(2) . . . 104(M). Each node 104(1), 104(2) . . . 104(M) can comprise a computing device. Nodes 104(1), 104(2) . . . 104(M) can be configured to serve objects in response to requests from clients 108A, 108B, 108C. Furthermore, typically one of the nodes 104(1), 104(2) . . . 104(M) can host a cluster controller virtual machine (not shown in FIG. 1), making that node the cluster controller node which administers the cluster 102. The nodes 104(1), 104(2) . . . 104(M) can be coupled to each other via a suitable data communications link comprising interfaces and protocols such as, but not limited to, Ethernet block 106.

Clients 108A, 108B, 108C can send requests to the cluster 102 via network 150, e.g., the Internet or any other communications network. The cluster 102 can optionally be configured as one large object namespace. The cluster 102 can maintain an unlimited number of objects, e.g., up to trillions of objects or more. To this end, a node such as the node 104(2) can comprise ports 112 by which clients 108A, 108B, 108C connect to the cluster 102. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an operating system 114, e.g., a OneFS® or other operating system. Each node, such as the node 104(2), can furthermore include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It should be emphasized that cluster deployments can be of any size. Depending on the needs of a particular organization, some clusters may comprise five or fewer nodes, while large clusters can comprise much larger numbers of nodes. The technologies disclosed herein can be included in clusters of any size, as can be appreciated.

Figure 2:
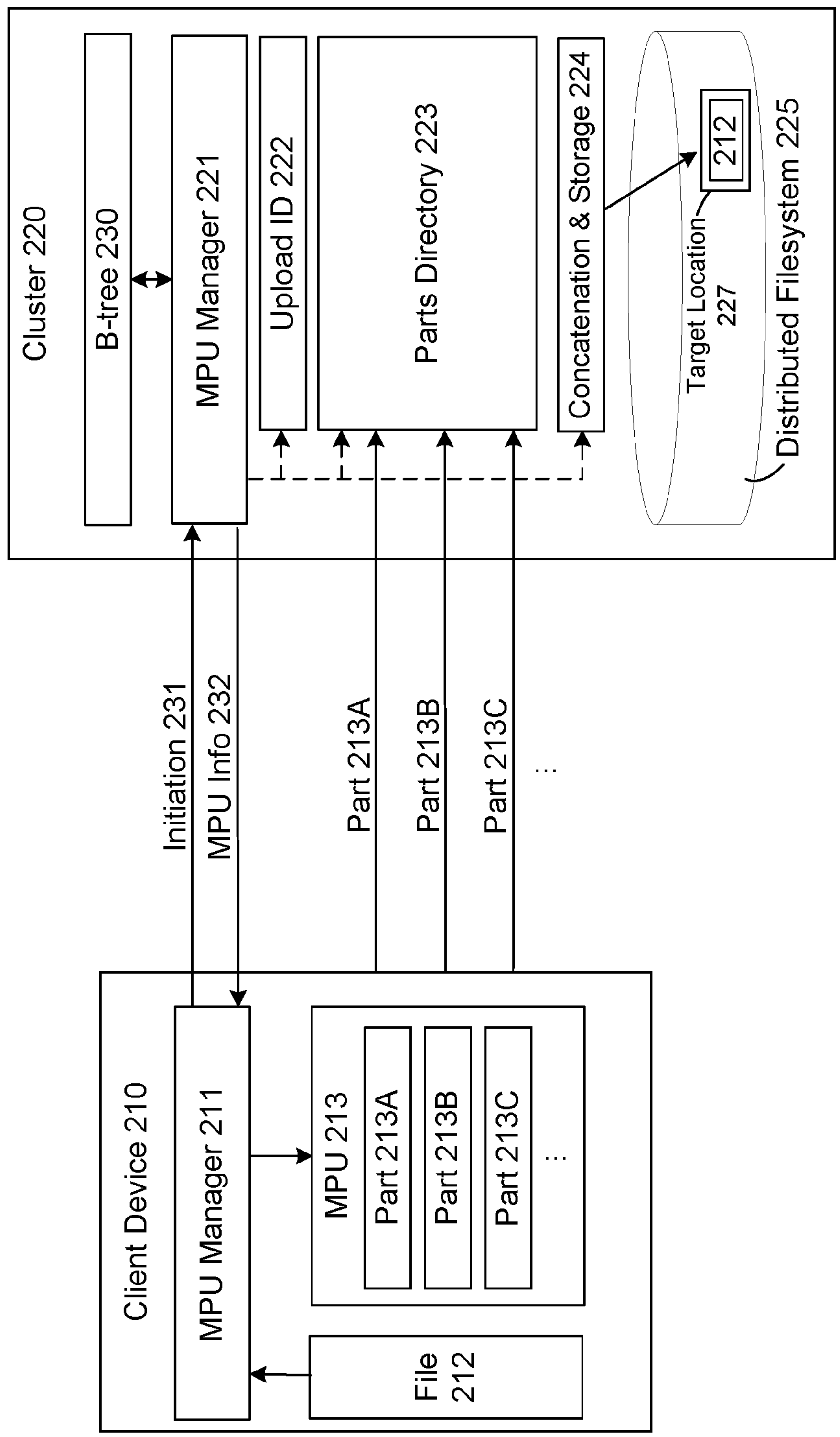
FIG. 2 illustrates an example multipart upload from a client device to a cluster, in accordance with one or more embodiments described herein.

FIG. 2 illustrates an example multipart upload from a client device to a cluster, in accordance with one or more embodiments described herein. A client device 210 can comprise an instance of client devices 108A, 108B, 108C introduced in FIG. 1, and a cluster 220 can comprise an instance of a cluster 102 introduced in FIG. 1. It should be appreciated that operations and components of cluster 220 can optionally be attributed to any node device within the cluster 220.

In FIG. 2, client device 210 comprises a multipart upload (MPU) manager 211, a file 212, and a multipart upload (MPU) 213. The MPU 213 comprises multiple parts including part 213A, part 213B, and part 213C. An ellipsis indicates that the MPU 213 can contain further parts. The MPU manager 211 can process the file 212 to generate MPU 213. The parts 213A, 213B, 213C can comprise parts of the file 212 which can be individually uploaded to the cluster 220.

Cluster 220 comprises B-tree 230, MPU manager 221, upload identifier (ID) 222, parts directory 223, concatenation and storage 224, and distributed filesystem 225. Distributed filesystem 225 includes an example target location 227 in which the uploaded file 212 can be stored. In response to an initiation 231 from the client device 210, the MPU manager 221 can use B-tree 230 to generate the upload ID 222 and the parts directory 223 for the MPU 213. The upload ID 222 and parts directory 223 information can be sent to the client device 210 as MPU Info 232. The client device 210 can upload the parts 213A, 213B, 213C to the cluster 220, where the parts 213A, 213B, 213C can be stored in the parts directory 223. Subsequent to receiving the parts 213A, 213B, 213C, concatenation and storage 224 can concatenate the parts 213A, 213B, 213C from the parts directory 223, thereby recreating the file 212. Concatenation and storage 224 can store the file 212 in the target location 227.

In some embodiments, the MPU manager 221 can generate the upload ID 222 using the B-tree 230. Furthermore, the upload ID 222 can be used in connection with generating the parts directory 223.

Figure 3:
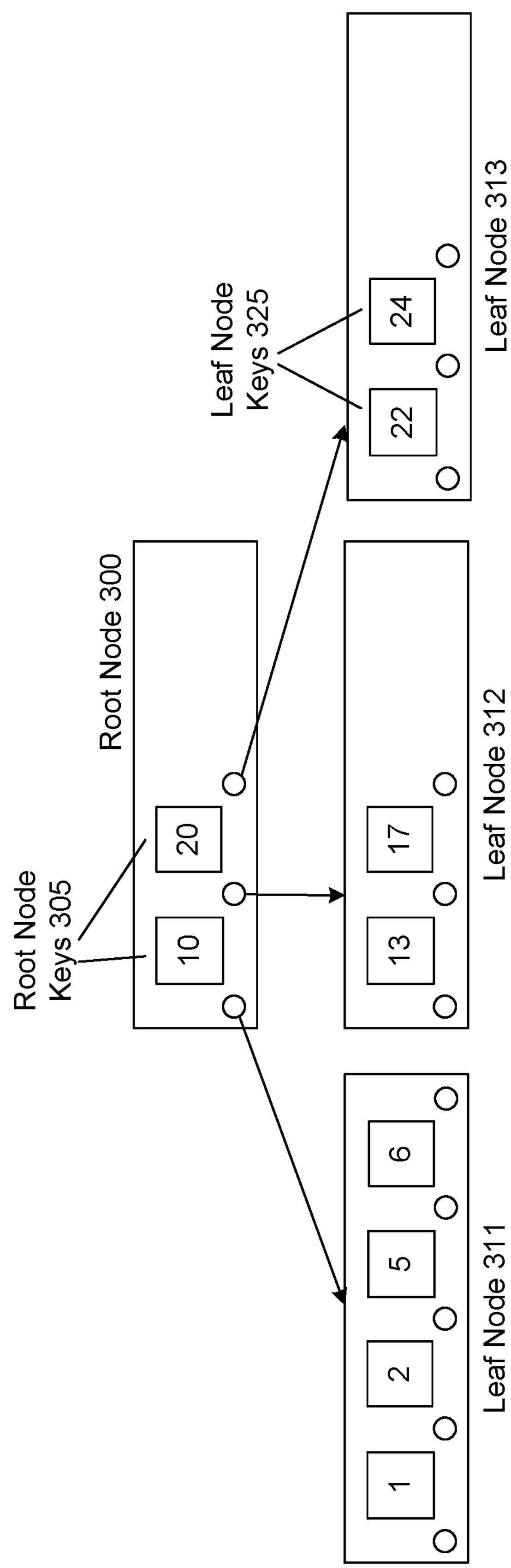
FIG. 3 illustrates an example B-tree, in accordance with one or more embodiments described herein.

FIG. 3 illustrates an example B-tree, in accordance with one or more embodiments described herein. The example B-tree can implement the B-tree 230 illustrated in FIG. 2 in some embodiments. FIG. 3 comprises an example root node 300 and three example leaf nodes 311, 312, 313. The root node 300 comprises two example root node keys 305. The example root node keys 305 are 10 and 20. Leaf node 311 comprises four example leaf node keys 325. The example leaf node keys 325 of leaf node 311 are 1, 2, 5, and 6. Leaf node 312 comprises two example leaf node keys 325. The example leaf node keys 325 of leaf node 312 are 13 and 17. Leaf node 313 comprises two example leaf node keys 325. The example leaf node keys 325 of leaf node 313 are 22 and 24.

Several B-tree variations are understood by those of skill in computer science, and this disclosure is not limited to any particular B-tree variant or structure. Furthermore, other tree data structures can optionally be used instead of a B-tree in some embodiments. In general, a B-tree comprises a self-balancing tree data structure that maintains sorted data and allows searches, sequential access, insertions, and deletions in logarithmic time. The B-tree generalizes the binary search tree, allowing for nodes with more than two children. In general, a B-tree of order m can be a tree which satisfies the following properties: (1) every node has at most m children; (2) every non-leaf node (except the root) has at least [m/2] child nodes; (3) the root has at least two children if it is not a leaf node; (4) a non-leaf node with k children contains k−1 keys; and (5) all leaves appear in the same level and carry no information. Each internal node's keys act as separation values which divide its subtrees. For example, if an internal node has three child nodes (or subtrees) then it must have 2 keys: $a_1$ and $a_2$. All values in the leftmost subtree will be less than $a_1$, all values in the middle subtree will be between $a_1$ and $a_2$, and all values in the rightmost subtree will be greater than $a_2$.

While the illustrated example B-tree does not include internal nodes, B-trees for use with this disclosure can optionally include internal nodes in some embodiments. Internal nodes are all nodes except for leaf nodes (e.g., 311, 312, 313) and the root node (e.g., 300). Internal nodes can be represented as an ordered set of elements and child pointers. Internal nodes can contain a maximum of U children and a minimum of L children. Thus, the number of elements can be one less than the number of child pointers (the number of elements is between L−1 and U−1). U can be either 2L or 2L−1; therefore each internal node is at least half full. The relationship between U and L implies that two half-full nodes can be joined to make a legal node, and one full node can be split into two legal nodes if there is room to push one element up into the parent. These properties make it possible to delete and insert new values into a B-tree and adjust the tree to preserve the B-tree properties. The number of children at root node 300 has the same upper limit as internal nodes, but has no lower limit. For example, when there are fewer than L−1 elements in the entire tree, the root will be the only node in the tree with no children at all.

In B-trees, internal nodes can have a variable number of child nodes within some pre-defined range. When data is inserted or removed from a node, its number of child nodes can change. In order to maintain the pre-defined range, internal nodes can be joined or split. The lower and upper bounds on the number of child nodes can be fixed. For example, in a 2-3 B-tree, each internal node can have 2 or 3 child nodes.

The nodes of a B-tree can contain a number of keys, as shown in FIG. 3. The keys can act as separation values which divide subtrees. For example, if a node such as root node 300 has three child nodes (or subtrees) then it can have 2 keys, as illustrated. Values in the leftmost subtree can be less than the first of the root node keys 305 (in this example, less than 10), values in the middle subtree can be between the first of the root node keys 305 and the second of the root node keys 305 (in this example, between 10 and 20), and values in the rightmost subtree can be greater than the second of the root node keys 305 (in this example, greater than 20).

In some instances, the number of keys can be chosen to vary between d and 2d, where d is the minimum number of keys, and d+1 is the minimum degree or branching factor of the tree. If an internal node has 2d keys, then adding a key to that node can be accomplished by splitting the hypothetical 2d+1 key node into two d key nodes and moving the key that would have been in the middle to the parent node. Each split node has the required minimum number of keys. Similarly, if an internal node and its neighbor each have d keys, then a key may be deleted from the internal node by combining it with its neighbor. Deleting the key would make the internal node have d−1 keys; joining the neighbor would add d keys plus one more key brought down from the neighbor's parent. The result is a full node of 2d keys.

The number of branches (or child nodes) from a node can be one more than the number of keys stored in the node. For example, in a 2-3 B-tree, the internal nodes can store either one key (with two child nodes) or two keys (with three child nodes). A B-tree can optionally be described with the parameters (d+1−(2d+1) or with the highest branching order, 2d+1.

A B-tree can be kept balanced after insertion by splitting a would-be overfilled node, of 2d+1 keys, into two d-key siblings and inserting the mid-value key into the parent. Depth only increases when the root is split, maintaining balance. Similarly, a B-tree can be kept balanced after deletion by merging or redistributing keys among siblings to maintain the d-key minimum for non-root nodes. A merger reduces the number of keys in the parent, potentially forcing it to merge or redistribute keys with its siblings. A change in depth can occur when the root has two children, of d and (transitionally) d−1 keys, in which case the two siblings and parent are merged, reducing the depth by one.

By using a large number of keys within internal nodes and/or the root node 300, the height of the B-tree decreases and the number of expensive node accesses can be reduced. In addition, rebalancing of the B-tree occurs less often. In some embodiments of this disclosure, a B-tree can use no internal nodes, and can include only a root node 300 and leaf nodes such as 311, 312, and 313. For each new upload ID, a new leaf node can be generated directly under the root node 300.

One example B-tree variant is a B+ tree, in which copies of the keys can be stored in the internal node, keys and records can be stored in leaves, and a leaf node may include a pointer to the next leaf node to speed sequential access. Another example B-tree variant is a B* tree, which can balance more neighboring internal nodes to keep the internal nodes more densely packed. Also, B-trees can be converted into order statistic trees to allow rapid searches for the Nth record in key order, counting the number of records between any two records, and various other related operations. Any B-tree variant or other tree data structure can optionally be used in connection with embodiments of this disclosure.

Figure 4:
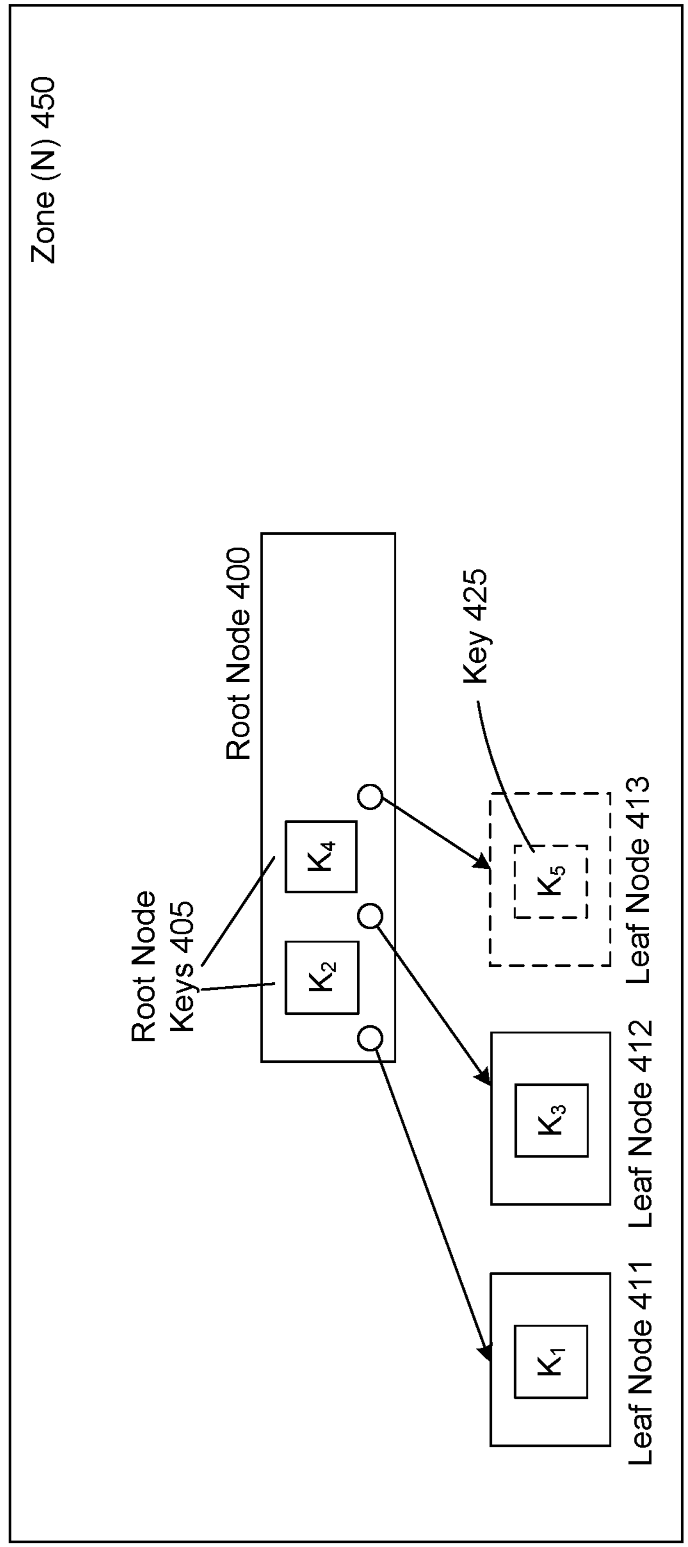
FIG. 4 illustrates an example creation of a leaf in a B-tree in connection with generating a cluster coherent unique identifier for a multipart upload, in accordance with one or more embodiments described herein.

FIG. 4 illustrates an example creation of a leaf in a B-tree in connection with generating a cluster coherent unique identifier for a multipart upload, in accordance with one or more embodiments described herein. The example B-tree in FIG. 4 can implement the B-tree 230 illustrated in FIG. 2 in some embodiments. FIG. 4 comprises a zone (N) 450. The zone (N) 450 can comprise one zone selected from among multiple different zones supported within a cluster. Each zone can be logically separate and can support different aspects of the cluster, for example, different sets of client devices. Each zone can have a B-tree for the purpose of generating cluster coherent unique identifiers for multipart uploads within that zone. The illustrated B-tree for zone (N) 450 comprises root node 400 and, initially, leaf nodes 411 and 412. The root node 400 comprises root node keys $K_2$ and $K_4$ 405, and the leaf nodes 411 and 412 also comprise respective keys $K_1$ and $K_3$ as shown. The purpose of the B-tree can be to create upload identifiers for the zone (N) 450, and the keys $K_1$ and $K_3$ can each correspond to multipart uploads within the zone (N) 450. The leaf node 413 can be generated in B-tree in response to initiation of a new multipart upload in zone (N) 450. The new leaf node 413 comprises a new key 425 which can be used as a cluster coherent unique identifier for a multipart upload in the zone (N) 450. In some cases, a new key of root keys 405 may be created in order to create a new leaf node in the B-tree. In other cases, creating a new leaf node can include creating a new internal node in the B-tree and/or re-arranging internal nodes as discussed in connection with FIG. 3.

Figure 5:
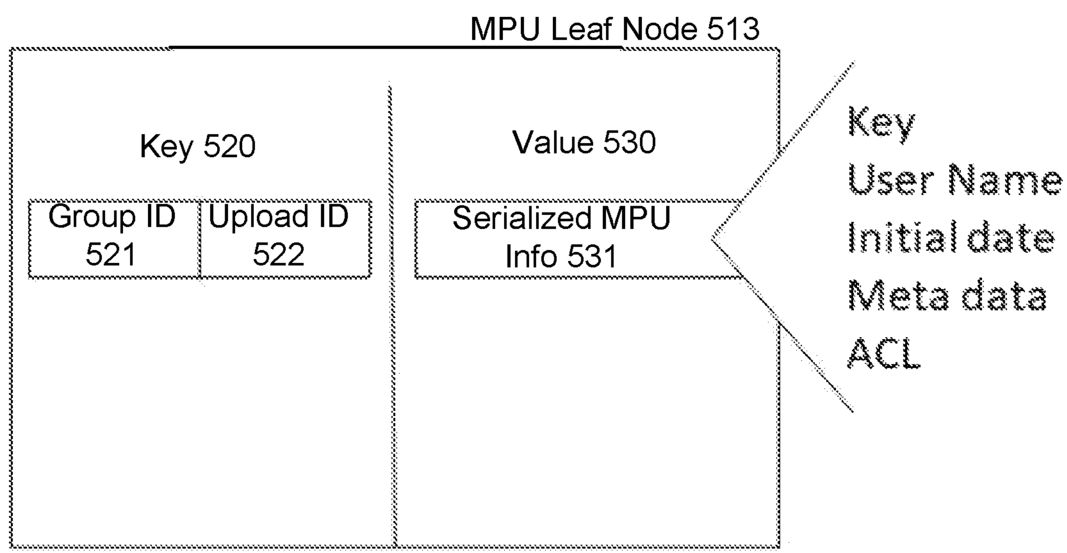
FIG. 5 illustrates an example B-tree leaf node for a multipart upload, the leaf node comprising a key linked to an associated value, in accordance with one or more embodiments described herein.

FIG. 5 illustrates an example B-tree leaf node for a multipart upload, the leaf node comprising a key linked to an associated value, in accordance with one or more embodiments described herein. The illustrated example B-tree leaf node can comprise, e.g., a leaf node in a B-tree such as B-tree 230 in FIG. 2. FIG. 5 includes MPU leaf node 513. The MPU leaf node 513 comprises a key 520. The key 520 comprises a group ID 521 and an upload ID 522, as shown. The upload ID 522 provides a cluster coherent unique identifier for a corresponding multipart upload. The group ID 521 can identify a group a group of multipart uploads associated with the corresponding multipart upload. For example, the group ID 521 can be associated with multipart uploads for a particular client relationship. A client relationship can be associated with an identifier, also referred to herein as a "bucket identifier", which identifies client data. Therefore, in some embodiments, the group ID 521 can comprise a bucket ID.

The key 520 can also be linked to a value 530. The value 530 can comprise serialized MPU Info 531. The serialized MPU Info 531 can include, for example, a key associated with the corresponding multipart upload, a user name associated with the corresponding multipart upload, initial data associated with the corresponding multipart upload, metadata associated with the corresponding multipart upload, and an access-control list (ACL) associated with the corresponding multipart upload.

Figure 6:
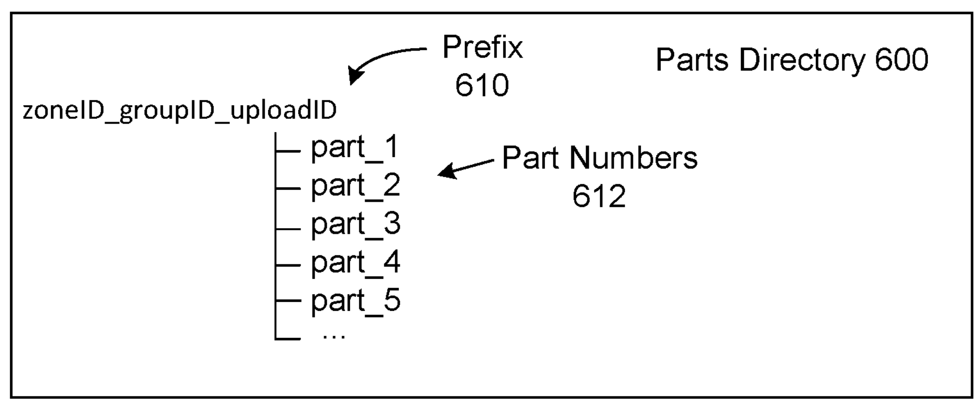
FIG. 6 illustrates an example parts directory for a multipart upload, in accordance with one or more embodiments described herein.

FIG. 6 illustrates an example parts directory for a multipart upload, in accordance with one or more embodiments described herein. In an embodiment, the parts directory 600 can be created within a target directory for a multipart upload. The parts directory 600 can use a prefix 610 created using a zone ID, a group (bucket) ID, and an upload ID. The upload ID can be determined from the key in the B-tree leaf node for the multipart upload. The zone ID and group ID can be determined based on the client that initiates the multipart upload. The parts directory 600 can comprise part numbers 612 in which upload parts can be stored. The quantity of part numbers 612 in the parts directory 600 can depend on the number of parts included in a multipart upload. For example, in an embodiment, one (1) to ten thousand (10,000) part numbers 612 can be created for a multipart upload.

In an example embodiment, multipart upload can be a component of a cluster Application Programming Interface (API). Using the API, a client can initiate a multipart upload, upload parts, and complete the multipart upload by concatenating the uploaded parts. To provide multipart upload functions at a cluster comprising a distributed filesystem, upload information and parts can be stored for the duration of the upload sequence in an efficient and performant way.

This functionality can be provided using a system B-tree (SBT) and parts directory as described herein.

Multipart upload can proceed in multiple stages. First, the multipart upload can be initiated and a unique upload ID can be obtained. Next, part files, also referred to herein as upload files or upload parts, can be uploaded with the upload ID. Finally, the multipart upload can be completed with the uploaded parts. Furthermore, embodiments can support various operations in connection with multipart upload. These include, for example, aborting an upload, listing multipart uploads, and listing uploaded parts associated with an upload ID. To provide multipart upload on a distributed filesystem, both multipart upload information and part files should be coherent on the cluster.

Techniques disclosed herein can employ (1) a system B-tree to store multipart upload information for each upload, and (2) a parts directory created under the target directory. Regarding the system B-tree, a system B-tree can optionally be created for each zone, as illustrated in FIG. 4. The system B-tree can have, e.g., 128 bit keys, and values can be up to about 8 KB. A high 64 bits of the key can comprise a group ID, also referred to herein as a bucket ID, which is unique in the cluster. A low 64 bits of the key can comprise the upload ID, which can be generated when a new key is inserted into the system B-tree. The system B-tree has an ability to do conditional creates, which the cluster can use to generate unique upload IDs without user space locking.

System B-tree values can comprise serialized multipart upload information, including object key, user name, initial date, object metadata, and ACL, as illustrated in FIG. 5. A server in the cluster can get any system B-tree entry with O(log N) by using the bucket ID and the upload ID after the multipart upload is initiated. To list uploads associated with a bucket ID, the cluster can use system B-tree's ability to query multiple entries with a given high 64 bit key.

The disclosed techniques employing system B-trees have certain advantages over other possible approaches, such as using a file for each upload, or using a SQL database. Using a file to store information for each upload is not space efficient because it uses at least the filesystem's block size, typically 8 KB, while multipart upload information can be less than 100 bytes if the key length is short and there is no metadata. Therefore using a system B-tree, which can have multiple entries in one block, is more efficient.

Creating a SQL database on a distributed filesystem has performance overhead and suffers from locking issues when multiple nodes in a cluster access the database concurrently. With system B-trees, there is no user space locking and so there is better concurrent access.

Furthermore, the disclosed techniques employing system B-trees can include the system B-trees on a same cluster which receives a multipart upload. For example, cluster 220 can comprise B-tree 230, the B-tree 230 can be cluster-wide consistent and fault-tolerant. The B-tree 230 can optionally exist on a same cluster 220 which receives a multipart upload 213, and not at a separate or remote server which is not part of cluster 220.

Regarding the parts directory, a parts directory can optionally be created under a target directory, as described in connection with FIG. 6. For example, if a key is a/b/c/d and a bucket root is /ifs/data, the parts directory can be created under /ifs/data/a/b/c. The parts directory can use a prefix created using a zone ID, bucket ID, and upload ID to avoid conflicts with user's files. Parts can be created under the parts directory with part numbers (e.g., 1 to 10,000).

The disclosed approach has multiple advantages. For example, a user's write permission to the target directory can be checked upon initiation of a multipart upload. Furthermore, the parts directory path can be determined with a key name, therefore no extra information is required to be stored in the multipart upload system B-tree. Also, during uploads, parts can be owned by the user, and putting the parts in the target directory makes quotas accurate. Finally, users can access the part files from other protocols such as network filesystem (NFS), server message block (SMB), etc., for administrative purposes.

Figure 7:
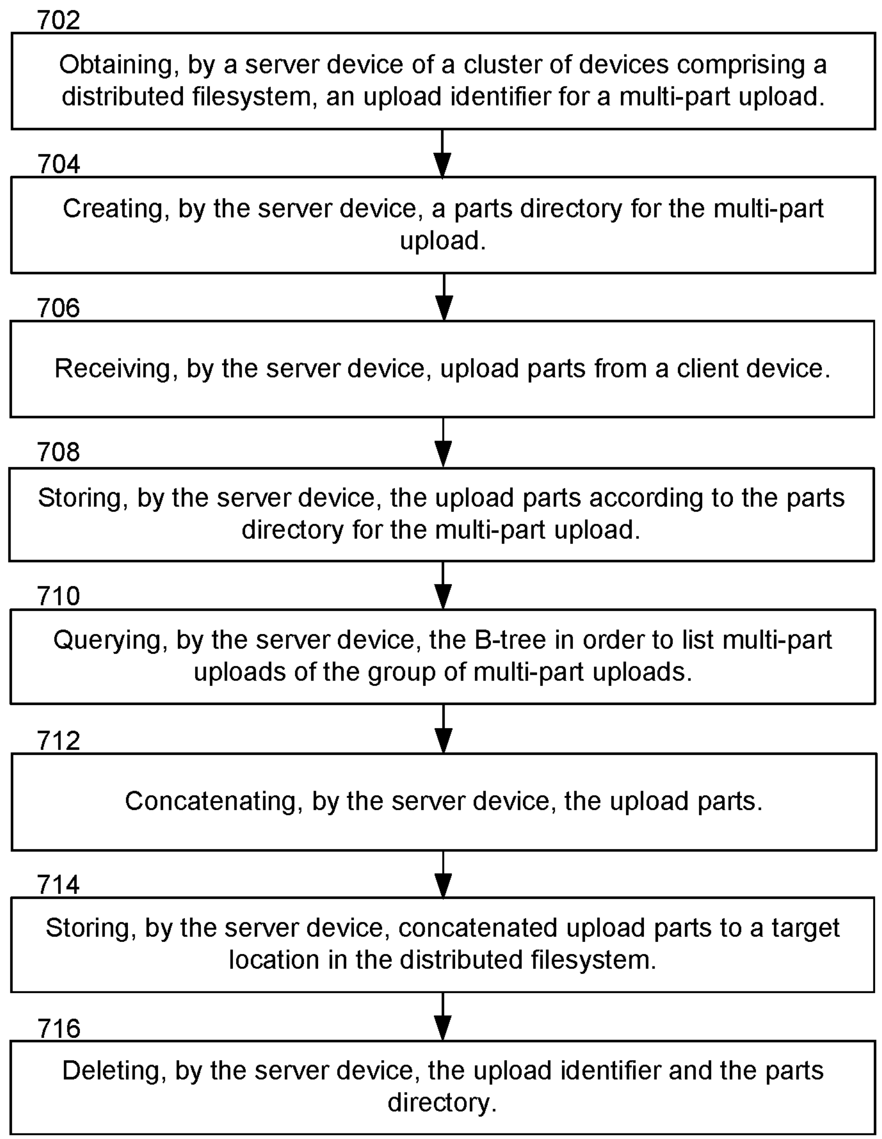
FIG. 7 is a flow diagram of an example, non-limiting computer implemented method for a server device to perform a multipart upload, in accordance with one or more embodiments described herein.

FIG. 7 is a flow diagram of an example, non-limiting computer implemented method for a server device to perform a multipart upload, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by one or more server devices at a cluster such as cluster 220 illustrated in FIG. 2. The cluster 220 can, although need not necessarily, comprise a distributed filesystem 225. At 702, the cluster 220 can be configured to obtain an upload identifier 222 for a multipart upload 213. Operation 702 can be performed for example in response to an initiation 231 received from a client device 210. The upload identifier 222 can provide a cluster coherent unique identifier for the multipart upload 213. In some embodiments, the upload identifier 222 can be obtained at least in part by creating a leaf in a B-tree. The leaf in the B-tree can comprise a key, and the key can comprise the upload identifier 222 and a value comprising multipart upload metadata. The key can further comprise a group identifier associated with a group of multipart uploads, as illustrated in FIG. 5.

At 704, the cluster 220 can be configured to create a parts directory 223 for the multipart upload 213. The parts directory 223 can use prefixes that are created using the upload identifier 222, as described in connection with FIG. 6. At 706, the cluster 220 can be configured to receive upload parts 213A, 213B, 213C, etc. from a client device 210. The parts 213A, 213B, 213C can be received serially or in parallel. At 708, the cluster 220 can be configured to store the upload parts 213A, 213B, and 213C according to the parts directory 223 for the multipart upload 213. In other words, the cluster 220 can store the upload parts 213A, 213B, and 213C in folders or in other locations designated in the parts directory 223.

Operation 710 comprises querying the B-tree in order to list multipart uploads of the group of multipart uploads. Operation 710 is an example operation that can be supported for example by an API provided by the cluster 220. Other supported operations can include aborting a multipart upload and listing multipart uploads. Example operation 710 can be performed before, during, or after operations related to initiating, receiving and storing a multipart upload.

At 712, the cluster 220 can be configured to concatenate the upload parts 213A, 213B, and 213C. Operation 712 can be performed subsequent to storing the upload parts 213A, 213B, and 213C in the parts directory 223 at operation 708. Concatenation and storage 224 can concatenate the upload parts 213A, 213B, and 213C from the parts directory 223. The result of concatenation can be recreation of the original file 212. At 714, concatenation and storage 224 can be configured to store concatenated upload parts, i.e., the file 212, to a target location 227 in the distributed filesystem 225. After storing the concatenated upload parts to the target location 227 in the distributed filesystem 225, at 714, the cluster 220 can optionally delete the upload identifier 222 and the parts directory 223. The multipart upload is complete and so the upload identifier 222 and the parts directory 223 are no longer needed.

Figure 8:
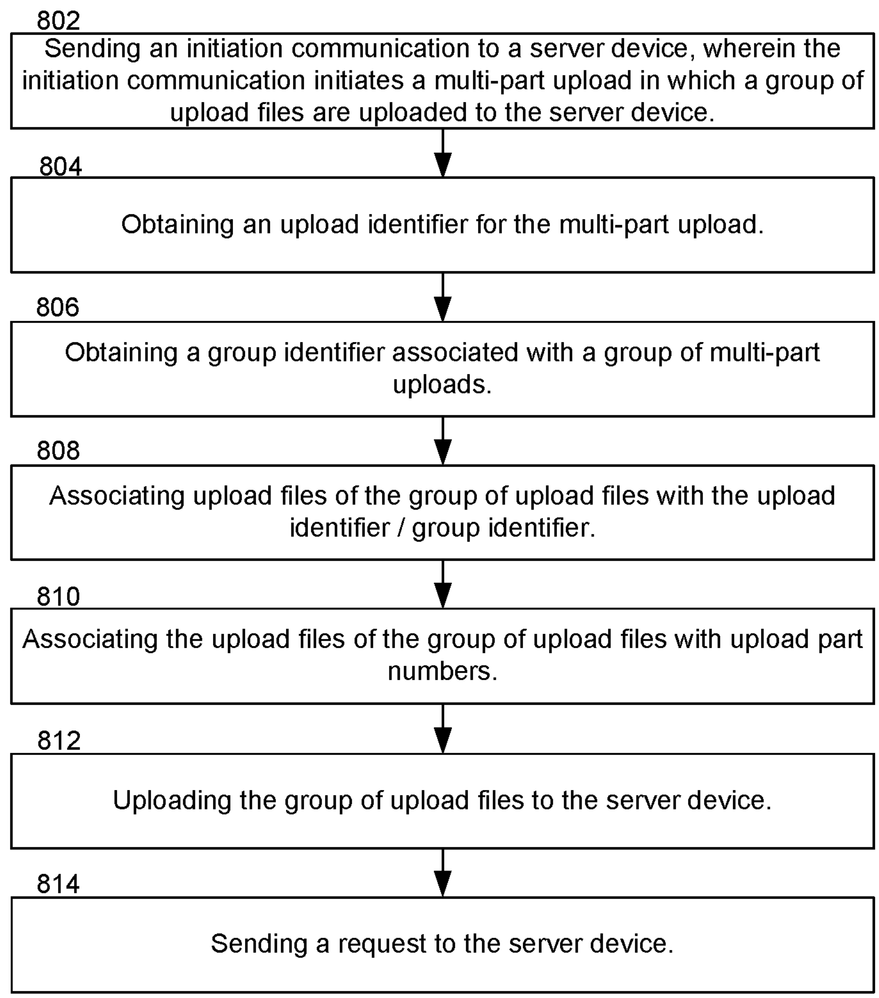
FIG. 8 is a flow diagram of an example, non-limiting computer implemented method for a client device to perform a multipart upload, in accordance with one or more embodiments described herein.

FIG. 8 is a flow diagram of an example, non-limiting computer implemented method for a client device to perform a multipart upload, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a client device, such as client device 210 in FIG. 2. At 802, the client device 210 can be configured to send an initiation communication 231 to a server device at cluster 220, wherein the initiation communication 231 initiates a multipart upload 213 in which a group of upload files, namely parts 213A, 213B, 231C, etc., are uploaded to the server device at the cluster 220.

At 804, the client device 210 can be configured to obtain an upload identifier 222 for the multipart upload 213. For example, the upload identifier 222 can be included in the MPU Info 232 returned from the cluster 220. Similarly, at 806, the client device 210 can be configured to obtain a group identifier associated with a group of multipart uploads. The group identifier can also be included in the MPU Info 232 returned from the cluster 220. The upload identifier 222 as well as the group identifier (not shown in FIG. 2) can comprise portions of a key associated with a leaf in a B-tree accessible by the server device at the cluster 220.

At 808, the client device 210 can be configured to associate upload files of the group of upload files, namely the upload parts 213A, 213B, and 213C, with the upload identifier 222. Associating the upload files with the upload identifier 222 can comprise also associating the upload files with the group identifier. The MPU manager 211 can generate the upload parts 213A, 213B, and 213C by breaking the file 212 into the various upload parts 213A, 213B, and 213C of appropriate size, and then associating the upload parts 213A, 213B, and 213C with the upload identifier 222, for example by including the upload identifier 222 along with other metadata to be uploaded with the upload parts 213A, 213B, and 213C.

At 810, the client device 210 can optionally be configured to associate the upload files of the group of upload files 213A, 213B, and 213C with upload part numbers. In some embodiments, upload part numbers based on the part numbers in the parts directory 223 can be included in the MPU Info 232, and the client device 210 can associate received part numbers with the upload files 213A, 213B, and 213C. In other embodiments, the client device 210 can associate the upload files 213A, 213B, and 213C with part numbers autonomously, and parts 213A, 213B, and 213C can be nonetheless placed in appropriately numbered folders in the parts directory 223 at the cluster 220.

At 812, after associating the upload files of the group of upload files 213A, 213B, and 213C with the upload identifier 222, the client device 210 can be configured to upload the group of upload files 213A, 213B, and 213C to the server device at the cluster 220. Uploading the group of upload files 213A, 213B, and 213C to the server device can comprise writing upload files of the group of upload files 213A, 213B, and 213C in a parts directory 223 provided by the server device.

Operation 814 represents sending a request, by the client device 210, to the server device at the cluster 220. The request can comprise, e.g., a request to abort the multipart upload, a request to list active multipart uploads, or a request to list uploaded files of the group of upload files. Such requests can be supported in some embodiments, in addition to the functions that support multipart upload itself.

Figure 9:
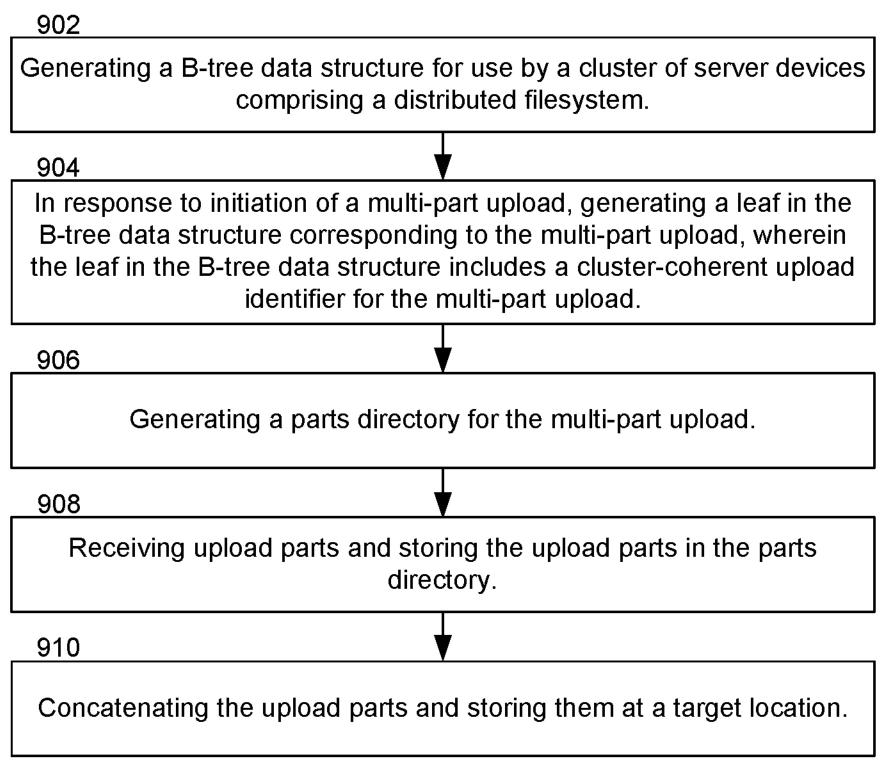
FIG. 9 is a flow diagram of an example, non-limiting computer implemented method for a computing cluster to perform a multipart upload, in accordance with one or more embodiments described herein.

FIG. 9 is a flow diagram of an example, non-limiting computer implemented method for a computing cluster to perform a multipart upload, in accordance with one or more embodiments described herein. The blocks of the illustrated method represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a cluster 220 comprising a distributed filesystem 225, such as illustrated in FIG. 2. At 902, the cluster 220 can be configured to generate a B-tree data structure for use by the cluster 220. In some embodiments, the cluster 220 can generate multiple B-tree data structures, e.g., a B-tree for each zone.

At 904, in response to initiation of a multipart upload 213, the cluster 220 can be configured to generate a leaf in the B-tree data structure corresponding to the multipart upload 213, wherein the leaf in the B-tree data structure includes a cluster coherent upload identifier 222 for the multipart upload 213. The upload identifier 222 can comprise a key in the B-tree data structure, e.g., as illustrated in FIG. 4. In some embodiments, the key in the B-tree data structure can further comprise a group identifier associated with a group of multipart uploads, e.g., the multipart uploads associated with a particular client.

At 906, the cluster 220 can be configured to generate a parts directory 223 for the multipart upload 213. The parts directory 223 can comprise directory locations which are identified by, e.g., a group identifier associated with a group of multipart uploads, the upload identifier 222, and/or upload part numbers to be associated with upload files 213A, 213B, and 213C of the multipart upload 213.

At 908, the cluster 220 can be configured to receive upload parts 213A, 213B, and 213C and store the upload parts 213A, 213B, and 213C in the parts directory 223. At 910, the cluster 220 can be configured to concatenate the upload parts 213A, 213B, and 213C and store them at a target location 227.

Figure 10:
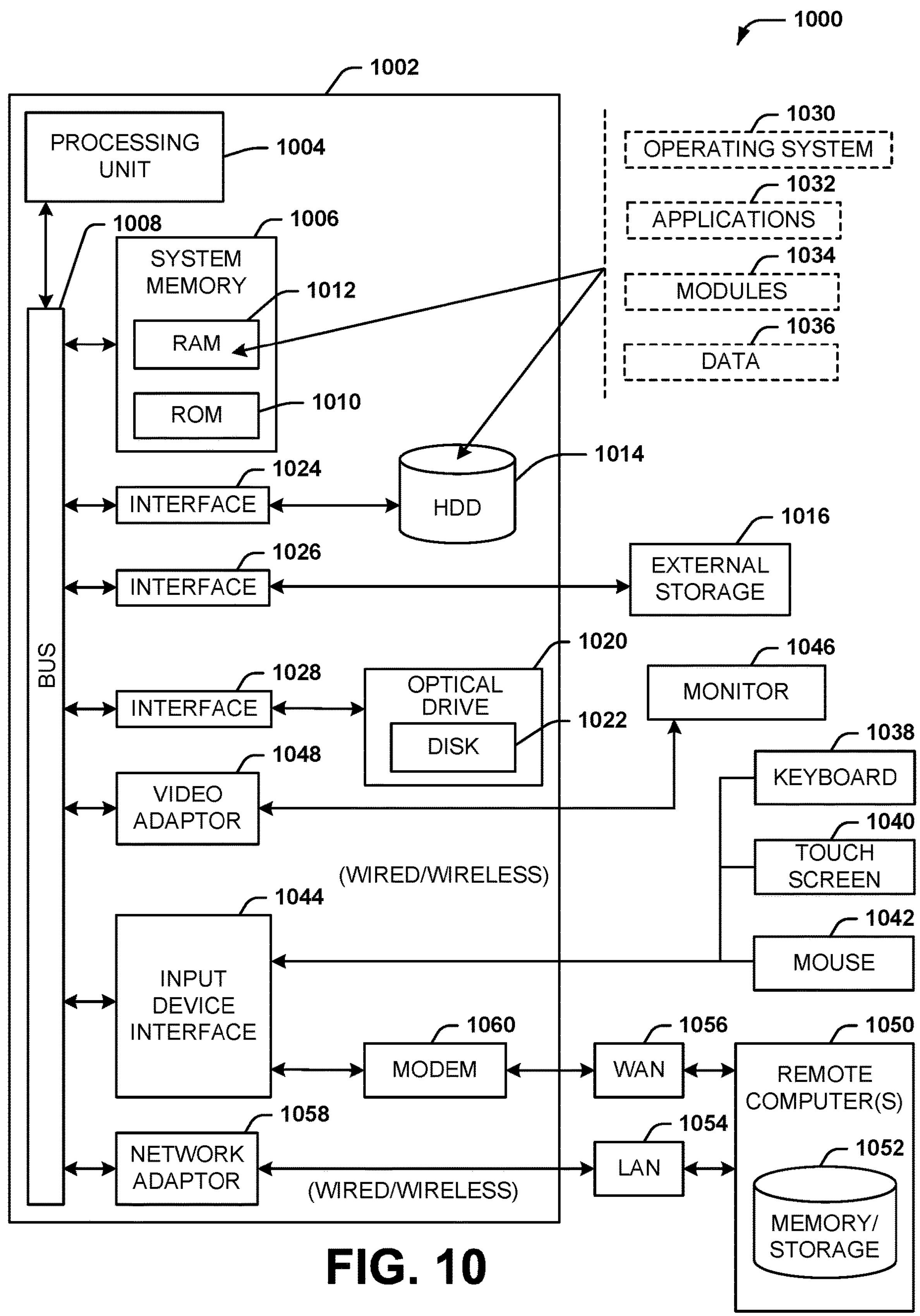
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

obtaining, by a server device of a cluster of devices comprising a distributed filesystem, an upload identifier for a multipart upload, wherein the obtaining the upload identifier comprises creating an additional leaf node among leaf nodes in a B-tree, wherein the B-tree comprises a root node and the leaf nodes, without internal nodes between the root node and the leaf nodes, wherein the root node has no parent node in the B-tree, wherein the additional leaf node comprises a key comprising the upload identifier and a value comprising multipart upload metadata, and wherein a high portion of the key comprises a group identifier associated with a group of multipart uploads and a low portion of the key comprises the upload identifier;

creating, by the server device, a parts directory for the multipart upload;

sending, by the server device, the group identifier and the upload identifier to a client device, wherein the client device associates upload parts with the group identifier and the upload identifier;

receiving, by the server device, the upload parts associated with the group identifier and the upload identifier from the client device;

storing, by the server device, the upload parts according to the parts directory for the multipart upload;

concatenating, by the server device, the upload parts; and storing, by the server device, concatenated upload parts to a target location in the distributed filesystem.

2. The method of claim 1, wherein the upload identifier provides a cluster coherent unique identifier for the multipart upload.

3. The method of claim 1, wherein the high portion of the key comprises a first sixty-four bit portion of the key, and wherein the low portion of the key comprises a second sixty-four bit portion of the key.

4. The method of claim 3, further comprising: querying, by the server device, the B-tree in order to list multipart uploads of the group of multipart uploads.

5. The method of claim 1, wherein the parts directory uses prefixes that are created using the upload identifier.

6. The method of claim 1, further comprising, after storing, by the server device, the concatenated upload parts to the target location in the distributed filesystem, deleting, by the server device, the upload identifier and the parts directory.

7. A client device, comprising:

at least one processor; and at least one memory that stores executable instructions that, when executed by the at least one processor, facilitate performance of operations, comprising:

sending an initiation communication to a server device, wherein the initiation communication initiates a multipart upload in which a group of upload files are uploaded to the server device;

obtaining, from the server device, an upload identifier for the multipart upload, wherein the upload identifier was generated at the server device at least in part by creating an additional leaf node among leaf nodes in a B-tree, wherein the B-tree comprises a root node and the leaf nodes, without internal nodes between the root node and the leaf nodes, wherein the root node has no parent node in the B-tree, wherein the additional leaf node comprises a key comprising the upload identifier and a value comprising multipart upload metadata, and wherein a high portion of the key comprises a group identifier associated with a group of multipart uploads and a low portion of the key comprises the upload identifier;

associating upload files of the group of upload files with the group identifier and the upload identifier; and after associating the upload files of the group of upload files with the group identifier and the upload identifier, uploading the group of upload files to the server device.

8. The client device of claim 7, wherein the uploading the group of upload files to the server device comprises writing upload files of the group of upload files in a parts directory provided by the server device.

9. The client device of claim 7, wherein a sixty four bit portion of the key comprises the upload identifier.

10. The client device of claim 8, wherein the parts directory uses prefixes that are created using the upload identifier.

11. The client device of claim 7, wherein a first half of the key comprises the group identifier, a second half of the key comprises the upload identifier.

12. The client device of claim 11, wherein the operations further comprise associating the upload files of the group of upload files with upload part numbers.

13. The client device of claim 7, wherein the operations further comprise sending a request to the server device, wherein the request comprises: a request to abort the multipart upload, a request to list active multipart uploads, or a request to list uploaded files of the group of upload files.

14. A non-transitory machine-readable medium comprising executable instructions that, when executed by a processor, facilitate performance of operations, comprising:

obtaining an upload identifier for a multipart upload, the obtaining comprising creating an additional leaf node among leaf nodes in a B-tree, wherein the B-tree comprises a root node and the leaf nodes, without internal nodes between the root node and the leaf nodes, wherein the root node has no parent node in the B-tree, and wherein the additional leaf node comprises a key comprising a high portion of the key comprising a group identifier associated with a group of multipart uploads and a low portion of the key comprising the upload identifier;

communicating the group identifier and the upload identifier to a client device, wherein the client device associates upload parts with the group identifier and the upload identifier;

receiving the upload parts associated with the group identifier and the upload identifier from the client device;

storing the upload parts according to a parts directory for the multipart upload;

concatenating the upload parts; and storing concatenated upload parts to a target location in a distributed filesystem.

15. The non-transitory machine-readable medium of claim 14, wherein the operations are performed by a server device of a cluster of devices comprising the distributed file system.

16. The non-transitory machine-readable medium of claim 14, wherein the additional leaf node in the B-tree further comprises a value comprising multipart upload metadata, wherein the multipart upload metadata comprises an access-control list associated with the multipart upload.

17. The non-transitory machine-readable medium of claim 14, wherein the operations further comprise creating the parts directory for the multipart upload.

18. The non-transitory machine-readable medium of claim 14, wherein the parts directory uses prefixes that are created using the upload identifier.

19. The non-transitory machine-readable medium of claim 14, wherein the upload identifier provides a cluster coherent unique identifier for the multipart upload.

20. The non-transitory machine-readable medium of claim 14, wherein a sixty four bit portion of the key comprises the group identifier.

* * * * *